US012744636B2

(12) United States Patent
Liu

(10) Patent No.: US 12,744,636 B2
(45) Date of Patent: Sep. 22, 2026

(54) METHODS FOR CONFIGURING AND RECEIVING INDICATION INFORMATION, USER EQUIPMENT, AND BASE STATION

(71) Applicant: Beijing Xiaomi Mobile Software Co., Ltd., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 342 days.

(21) Appl. No.: 18/559,431

(22) PCT Filed: May 8, 2021

(86) PCT No.: PCT/CN2021/092510
§ 371 (c)(1),
(2) Date: Nov. 7, 2023

(87) PCT Pub. No.: WO2022/236508
PCT Pub. Date: Nov. 17, 2022

(65) Prior Publication Data
US 2024/0243868 A1 Jul. 18, 2024

(51) Int. Cl.
*H04L 5/00* (2006.01)

(52) U.S. Cl.
CPC .......... *H04L 5/0048* (2013.01); *H04L 5/0053* (2013.01)

(58) Field of Classification Search
CPC ... H04L 5/0048; H04L 5/0053; H04L 5/0091; H04L 5/0094
See application file for complete search history.

(56) References Cited

U.S. PATENT DOCUMENTS

2018/0027535 A1* 1/2018 Guo .................... H04W 72/04 370/329
2019/0280803 A1* 9/2019 Muruganathan ........ H04L 5/005
2020/0052803 A1 2/2020 Deenoo et al.
2020/0059967 A1* 2/2020 Kim .................... H04L 1/0026
2020/0389883 A1 12/2020 Faxér et al.
2021/0136532 A1* 5/2021 Liu .................... H04L 5/0094
2023/0141024 A1* 5/2023 Xu .................... H04W 52/0229 370/329
2024/0014973 A1* 1/2024 Xu .................... H04W 68/02
2024/0064637 A1* 2/2024 Gurumoorthy ....... H04W 56/00
2025/0158862 A1* 5/2025 Li .................... H04L 5/0094

FOREIGN PATENT DOCUMENTS

CN 101959134 A 1/2011
CN 109217985 A 1/2019
CN 111867017 A 10/2020
CN 112586077 A 3/2021

OTHER PUBLICATIONS

Oppo, "Further discussion on RS occasion for idle/inactive UEs", 3GPP TSG RAN WG1 #104-e R1-2100169, Feb. 5, 2021, section 2.
Qualcomm Incorporated, "TRS/CSI-RS for idle/inactive UE power saving", 3GPP TSG-RAN WG1 #104-bis-e, R1-2103178, Apr. 20, 2021.

* cited by examiner

*Primary Examiner* — Jeong S Park
(74) *Attorney, Agent, or Firm* — Volpe Koenig

(57) ABSTRACT

A method for configuring indication information, including: sending an indication message to a UE, the indication message including an indication identifier, and the indication identifier being used to indicate the UE to receive, according to a transmission mode indicated by the indication identifier, an available state of a reference signal.

20 Claims, 6 Drawing Sheets

METHODS FOR CONFIGURING AND RECEIVING INDICATION INFORMATION, USER EQUIPMENT, AND BASE STATION

CROSS-REFERENCE TO RELATED APPLICATION

The present application is a U.S. National Stage of International Application No. PCT/CN2021/092510, filed on May 8, 2021, the contents of all of which are incorporated herein by reference in their entirety for all purposes.

BACKGROUND

In 5G NR (New Radio), a user equipment (UE) and a network are synchronized in a time-frequency domain by introducing a reference signal such as a tracking reference signal (TRS)/a channel state information-reference signal (CSI-RS). In general, a base station needs to indicate to the UE an available state of the TRS/CSI-RS, such that the UE may synchronize with the network in the time-frequency domain according to the available state of the TRS/CSI-RS.

SUMMARY

The present disclosure relates to the field of communications, in particular to a method and apparatus for configuring indication information, a method and apparatus for receiving indication information, a user equipment, a base station, and a storage medium.

In one aspect of the present disclosure, there is provided a method for configuring indication information, which is performed by a base station, the method including: sending an indication message to a user equipment (UE), the indication message including an indication identifier, and the indication identifier being used to indicate the UE to receive, according to a transmission mode indicated by the indication identifier, an available state of a reference signal.

In another aspect of the present disclosure, there is provided a method for receiving indication information, which is performed by a UE, the method including: receiving an indication message sent by a base station, the indication message including an indication identifier, and the indication identifier being used to indicate a transmission mode for an available state of a reference signal; and receiving the available state of the reference signal according to the transmission mode indicated by the indication identifier.

In yet another aspect of the present disclosure, there is provided an apparatus for configuring indication information, the apparatus including: a sending module, used to send an indication message to a UE, the indication message including an indication identifier, and the indication identifier being used to indicate the UE to receive, according to a transmission mode indicated by the indication identifier, an available state of a reference signal.

In yet another aspect of the present disclosure, there is provided an apparatus for receiving indication information, the apparatus including: a receiving module, used to receive an indication message sent by a base station, the indication message including an indication identifier, and the indication identifier being used to indicate a transmission mode for an available state of a reference signal; and receive the available state of the reference signal according to the transmission mode indicated by the indication identifier.

In yet another aspect of the present disclosure, there is provided a user equipment (UE), including: a transceiver; a memory; and a processor, connected to the transceiver and the memory respectively, used to control, by executing a computer-executable instruction stored on the memory, the transceiver to receive and transmit wireless signals, and capable of implementing the method provided in the examples in the above aspects.

In yet another aspect of the present disclosure, there is provided a base station, including: a transceiver; a memory; and a processor, connected to the transceiver and the memory respectively, used to control, by executing a computer-executable instruction stored on the memory, the transceiver to receive and transmit wireless signals, and capable of implementing the method provided in the examples in the above aspects.

In yet another aspect of the present disclosure, there is provided a non-transitory computer readable storage medium, storing a computer-executable instruction which, when executed by a processor, causes the processor to implement the above methods.

BRIEF DESCRIPTION OF THE DRAWINGS

The above and/or additional aspects and benefits of the present disclosure will become apparent and easy to understand from the description of the examples, in which:

FIG. 6 is a schematic flowchart of a method for receiving indication information provided in yet another example of the present disclosure.

FIG. 7 is a schematic flowchart of a method for receiving indication information provided in yet another example of the present disclosure.

DETAILED DESCRIPTION

Figure 1:
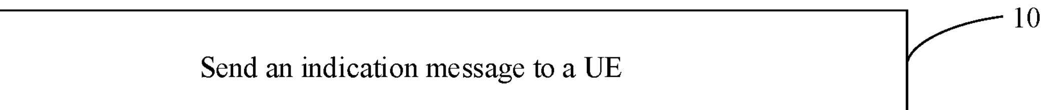
FIG. 1 is a schematic flowchart of a method for configuring indication information provided in an example of the present disclosure.

The examples will be described in detail, and examples thereof are shown in the accompanying drawings. When the following description refers to the accompanying drawings, unless otherwise indicated, the same numbers in different drawings indicate the same or similar elements. The implementations described in the following examples are not all the examples consistent with the present disclosure. On the contrary, these examples are simply examples of apparatuses and methods consistent with certain aspects of the present disclosure, as detailed in the appended claims.

The terms used in the examples of the present disclosure are for the purpose of describing particular examples and are not intended to limit the examples of the present disclosure. The singular forms "a/an" and "the" used in the examples of the present disclosure and the appended claims are intended to include the plural forms as well, unless otherwise clearly indicated in the context. It is also to be understood that the term "and/or" as used in the present disclosure means and includes any and all combinations of one or more related listed items.

It is to be understood that, although the terms "first", "second", "third", etc., may be used to describe various information in the examples of the present disclosure, the information should not be limited to these terms. These terms are used to distinguish information of the same type from each other. For example, "first information" may also be referred to as "second information" without departing from the scope of the examples of the present disclosure. Similarly, "second information" may also be referred to as "first information". Depending on the context, the words "in case of" and "in the event of" as used in the present disclosure may be interpreted as "as . . . " or "when . . . " or "in response to determining".

A description will be made in detail to the examples of the present disclosure, examples of which are illustrated in the accompanying drawings. The reference symbols, which are the same or similar throughout the accompanying drawings, represent the same or similar elements. The examples described below with reference to the accompanying drawings are intended to be illustrative, and are intended to explain the present disclosure, rather than being construed as limitations to the present disclosure.

In related art, the base station generally indicates the available state of the TRS/CSI-RS to the UE through a system message, resulting in low flexibility.

In a method for receiving indication information provided in the examples of the present disclosure, a base station may send an indication message to a UE, the indication message including an indication identifier, and the indication identifier being used to indicate that the UE is to receive, according to a transmission mode indicated by the indication identifier, an available state of a reference signal. Thus, in the examples of the present disclosure, the base station may transmit the available state of the reference signal to the UE by selecting one of a variety of transmission modes, rather than a fixed transmission mode. Thereby, enriching configuration schemes of the base station, and improving the flexibility of the base station in selecting a configuration scheme.

A method and apparatus for configuring indication information, a method and apparatus for receiving indication information, a user equipment, a base station, and a storage medium provided in the present disclosure will be described in detail below with reference to the accompanying drawings.

FIG. 1 is a schematic flowchart of a method for configuring indication information provided in the examples of the present disclosure, which is performed by an access network device. As shown in FIG. 1, the method for configuring indication information may include step 101.

Step 101 includes sending an indication message to a UE.

It should be noted that the method for configuring the indication information in the examples of the present disclosure may be applied to any UE. The UE may refer to a device that provides voice and/or data connectivity to a user. The UE may communicate with one or more core networks via a radio access network (RAN). The UE may be an Internet of Things (IoT) terminal, such as a sensor device, a mobile phone (or a "cellular" phone), and a computer with an IoT terminal, e.g., a fixed, portable, pocket-sized, hand-held, computer-built or a vehicle-mounted apparatus. For example, the UE may be a station (STA), a subscriber unit, a subscriber station, a mobile station, a mobile, a remote station, an access point, a remote terminal, an access terminal, a user terminal, or a user agent. Alternatively, the UE may be a device for an unmanned aerial vehicle. Alternatively, the UE may be a vehicle-mounted device, e.g., a trip computer with a wireless communication function, or a wireless terminal externally connected to a trip computer. Alternatively, the UE may be a roadside device, e.g., a street lamp, a signal lamp or other roadside device with a wireless communication function.

Moreover, in an example of the present disclosure, the indication message may be included in a system message, i.e., the base station may send the indication message through the system message.

Further, in an example of the present disclosure, the indication message may include an indication identifier, and the indication identifier may be used to indicate a transmission mode for transmitting an available state of a reference signal, so that the UE may receive the available state of the reference signal according to the transmission mode indicated by the indication identifier sent by the base station. The UE may be synchronized with the network in a time-frequency domain according to the available state of the reference signal. Thus shortening the wake-up cycle of the UE and saving power consumption. The available state of the reference signal may include whether the reference signal is available or unavailable, and the UE can synchronize with the network in the time-frequency domain according to the reference signal in a case that the reference signal is available. In an example of the present disclosure, the reference signal may include at least one of a TRS, a CSI-RS, or a secondary synchronization signal (SSS).

In an example of the present disclosure, the transmission mode indicated by the indication identifier may include the following transmission modes.

In a first transmission mode, the available state of the reference signal is transmitted through downlink control information (DCI) signaling alone. In an example of the present disclosure, the DCI signaling may include paging DCI.

In an example of the present disclosure, transmitting the available state of the reference signal through the DCI signaling may include: indicating the available state of the reference signal by using a first indication bit included in the DCI signaling, such that the available state of the reference signal can be determined through the first indication bit in the DCI signaling after the UE receives the DCI signaling sent by the base station.

In an example of the present disclosure, the first indication bit may include n bits, n being an integer, and $n \geq 1$.

For example, in an example of the present disclosure, the first indication bit may be one bit. In an example of the present disclosure, in a case that the first indication bit is 1, the first indication bit may indicate that the available state of the reference signal is available. In a case that the first indication bit is 0, the first indication bit may indicate that the available state of the reference signal is unavailable.

In a second transmission mode, the available state of the reference signal is transmitted through a System Information Block (SIB) alone.

In an example of the present disclosure, transmitting the available state of the reference signal through the SIB may include: indicating the available state of the reference signal by using a second indication bit included in a system message, so that the available state of the reference signal can be determined through the second indication bit in the system message after the UE receives the system message sent by the base station.

In an example of the present disclosure, the second indication bit may include n bits, n being an integer, and n≥1.

For example, in an example of the present disclosure, the second indication bit may be one bit. In an example of the present disclosure, in a case that the second indication bit is 1, the second indication bit may indicate that the available state of the reference signal is available; and in a case that the second indication bit is 0, the second indication bit may indicate that the available state of the reference signal is unavailable.

In an example of the present disclosure, in a case that the transmission mode indicated by the base station through the system message is the second transmission mode (i.e., the available state of the reference signal is transmitted through the SIB), the system message used to indicate the transmission mode and the system message used to indicate the available state of the reference signal may be the same system message, i.e., the system message used to indicate the transmission mode may also be used to indicate the available state of the reference signal. Accordingly, after the UE receives the system message sent by the base station, the UE may first determine, according to the system message, the transmission mode for the available state of the reference signal transmitted by the base station as the second transmission mode, and then determine the available state of the reference signal from the system message.

In another example of the present disclosure, in a case that the transmission mode indicated by the base station through the system message is the second transmission mode, the system message used to indicate the transmission mode and the system message used to indicate the available state of the reference signal may be different system messages.

In a third transmission mode, the available state of the reference signal is transmitted through the DCI signaling and the SIB.

In a case that the transmission mode indicated by the indication identifier is the third transmission mode, in an example of the present disclosure, the available state of the reference signal transmitted through the DCI signaling and the available state of the reference signal transmitted through the SIB may be the same. In another example of the present disclosure, the available state of the reference signal transmitted through the DCI signaling and the available state of the reference signal transmitted through the SIB may be different. Moreover, in an example of the present disclosure, in a case that the available state of the reference signal transmitted through the DCI signaling and the available state of the reference signal transmitted through the SIB are different, the available state of the reference signal indicated by a signal, which is sent later in the DCI signaling and the SIB, prevails. For example, in a case where the DCI signaling is sent after the SIB, the available state of the reference signal transmitted through the DCI signaling prevails.

Further, in an example of the present disclosure, the indication identifier may include n bits, n being an integer, and n≥1.

Moreover, in an example of the present disclosure, the indication identifier may include two bits, i.e., n=2, and a method for indicating a transmission mode by an indication identifier may include: the indication identifier is 01, and the transmission mode indicated by the indication identifier is the first transmission mode; the indication identifier is 10, and the transmission mode indicated by the indication identifier is the second transmission mode; and the indication identifier is 00, and the transmission mode indicated by the indication identifier is the third transmission mode.

In another example of the present disclosure, the indication identifier may include one bit, i.e., n=1, and a method for indicating a transmission mode by an indication identifier may include: the indication identifier is 1, and the transmission mode indicated by the indication identifier is the first transmission mode or the second transmission mode; and the indication identifier is 0, and the transmission mode indicated by the indication identifier is the third transmission mode.

In an example of the present disclosure, in a case that the transmission mode indicated by the indication identifier sent by the base station to the UE is the first transmission mode or the second transmission mode, it means that the base station may transmit the available state of the reference signal by selecting a transmission mode from either the first transmission mode or the second transmission mode.

On this basis, in an example of the present disclosure, in a case that the transmission mode indicated by the indication identifier received by the UE is either the first transmission mode or the second transmission mode, since the system message is generally sent before the DCI signaling, the UE may determine, according to whether the system message received by the UE indicates the available state of the reference signal, whether the transmission mode indicated by the indication identifier is the first transmission mode or the second transmission mode. In a case that the system message received by the UE indicates the available state of the reference signal, it means that the base station transmits the available state of the reference signal through the second transmission mode; and in a case that the system message received by the UE does not indicate the available state of the reference signal, it means that the base station transmits the available state of the reference signal through the first transmission mode, and the UE may determine the available state of the reference signal according to subsequently received DCI signaling.

Further, in an example of the present disclosure, after the base station sends the indication message to the UE, the base station may send the available state of the reference signal to the UE according to the transmission mode indicated by the indication identifier in the indication message.

It should be noted that, in an example of the present disclosure, in a case where the base station transmits the available state of the reference signal through the DCI signaling (e.g., paging DCI signaling), the base station may send the available state of the reference signal to the UE in an idle state through the DCI signaling.

In another example of the present disclosure, in a case where the base station transmits the available state of the reference signal through the SIB, the base station may send the available state of the reference signal to the UE in a connected state through the SIB.

In summary, according to the methods for configuring indication information provided in the examples of the present disclosure, the base station may send an indication message to the UE, the indication message including an indication identifier, and the indication identifier being used to indicate the UE to receive, according to a transmission mode indicated by the indication identifier, an available state of a reference signal. Thus, in the examples of the present disclosure, the base station may transmit the available state of the reference signal to the UE through a variety of transmission modes, achieving high flexibility. Moreover, by transmitting the available state of the reference signal to the UE, the UE may synchronize with the network in a time-frequency domain according to the reference signal in case that the available state of the reference signal is available, which can shorten the wake-up cycle, reduce power consumption, and save energy and power.

Figure 2:
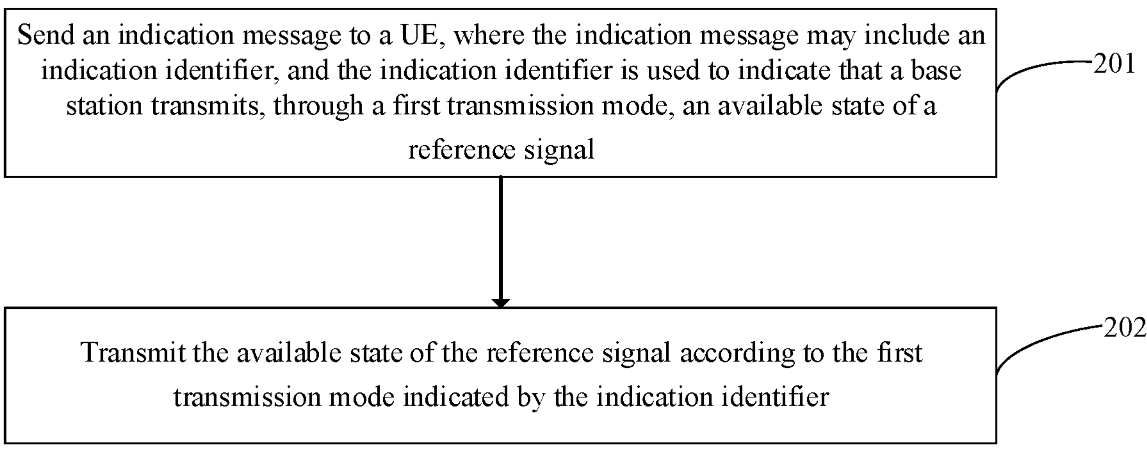
FIG. 2 is a schematic flowchart of a method for configuring indication information provided in another example of the present disclosure.

FIG. 2 is a schematic flowchart of a method for configuring indication information provided in another example of the present disclosure, which is performed by a base station. As shown in FIG. 2, the method for configuring indication information may include steps 201 and 202.

Step 201 includes sending an indication message to a UE, where the indication message may include an indication identifier, and the indication identifier is used to indicate that the base station transmits an available state of a reference signal through a first transmission mode.

In an example of the present disclosure, a detailed description about the UE, the first transmission mode, the reference signal, and the indication identifier may refer to the above examples, which will not be described again in this example of the present disclosure.

Step 202 includes transmitting the available state of the reference signal through the first transmission mode indicated by the indication identifier.

In summary, in the method for configuring indication information provided in the example of the present disclosure, the base station may send an indication message to the UE, the indication message including an indication identifier, and the indication identifier being used to indicate the UE to receive, according to a transmission mode indicated by the indication identifier, an available state of a reference signal. Thus, in the examples of the present disclosure, the base station may transmit the available state of the reference signal to the UE through a variety of transmission modes, achieving high flexibility. Moreover, by transmitting the available state of the reference signal to the UE, the UE may synchronize with a network in a time-frequency domain according to the reference signal in, a case where the available state of the reference signal is available, which can shorten the wake-up cycle, reduce power consumption, and save energy and power.

Figure 3:
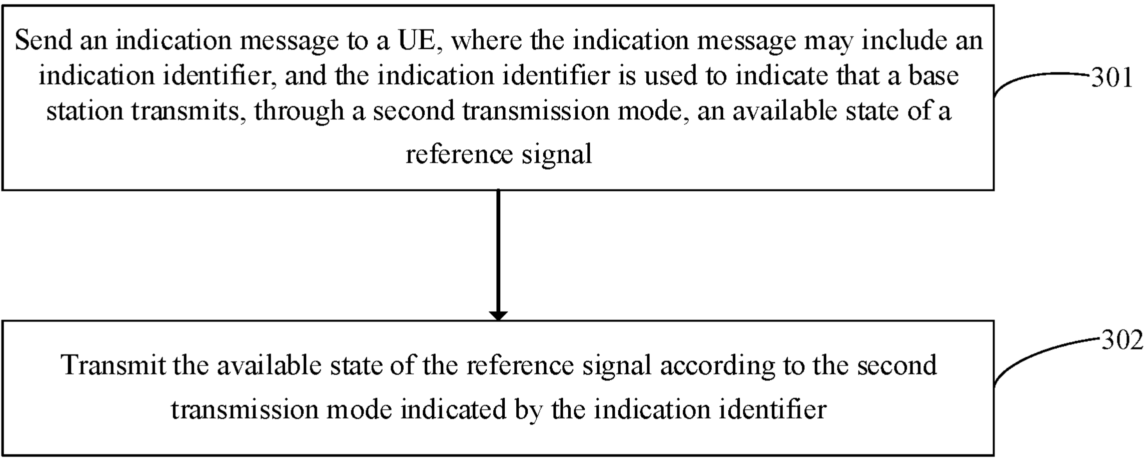
FIG. 3 is a schematic flowchart of a method for configuring indication information provided in still another example of the present disclosure.

FIG. 3 is a schematic flowchart of a method for configuring indication information provided in still another example of the present disclosure, which is performed by a base station. As shown in FIG. 3, the method for configuring indication information may include steps 301 and 302.

Step 301 includes sending an indication message to a UE, where the indication message may include an indication identifier, and the indication identifier is used to indicate that the base station transmits an available state of a reference signal through a second transmission mode.

In an example of the present disclosure, detailed description about the UE, the second transmission mode, the reference signal and the indication identifier may refer to the above examples, which will not be described again in this example of the present disclosure.

Step 302 includes transmitting the available state of the reference signal through the second transmission mode indicated by the indication identifier.

In summary, in the method for configuring indication information provided in the example of the present disclosure, the base station may send an indication message to the UE, the indication message including an indication identifier, and the indication identifier being used to indicate the UE to receive, according to a transmission mode indicated by the indication identifier, an available state of a reference signal. Thus, in the examples of the present disclosure, the base station may transmit the available state of the reference signal to the UE through a variety of transmission modes, achieving high flexibility. Moreover, by transmitting the available state of the reference signal to the UE, the UE may synchronize with a network in a time-frequency domain according to the reference signal in a case that the available state of the reference signal is available, which can shorten the wake-up cycle, reduce power consumption, and save energy and power.

Figure 4:
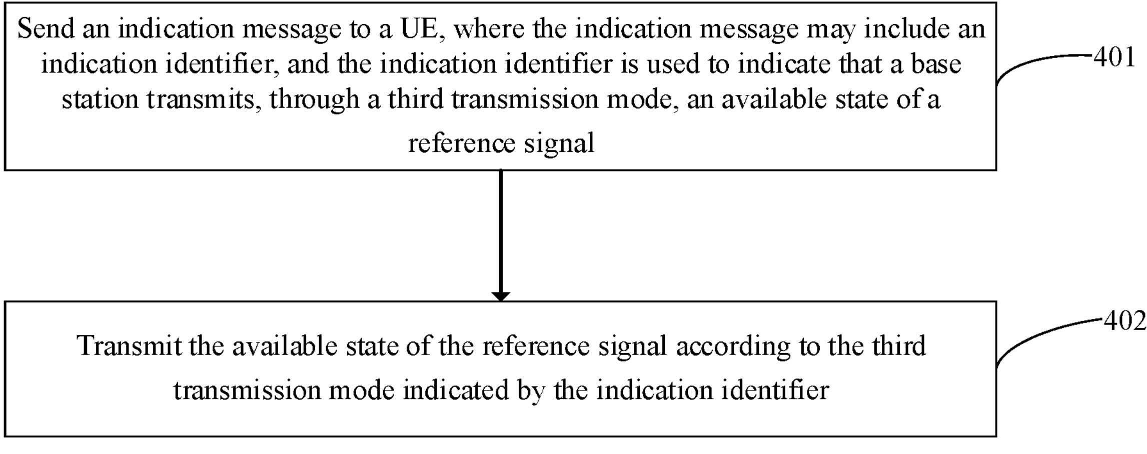
FIG. 4 is a schematic flowchart of a method for configuring indication information provided in yet another example of the present disclosure.

FIG. 4 is a schematic flowchart of a method for configuring indication information provided in yet another example of the present disclosure, which is performed by a base station. As shown in FIG. 4, the method for configuring indication information may include steps 401 and 402.

Step 401 includes sending an indication message to a UE, where the indication message may include an indication identifier, and the indication identifier is used to indicate that the base station transmits an available state of a reference signal through a third transmission mode.

In an example of the present disclosure, a detailed description about the UE, the third transmission mode, the reference signal, and the indication identifier may refer to the above examples, which will not be described again in this example of the present disclosure.

Step 402 includes transmitting the available state of the reference signal through the third transmission mode indicated by the indication identifier.

In summary, in the method for configuring indication information provided in the example of the present disclosure, the base station may send an indication message to the UE, the indication message including an indication identifier, and the indication identifier being used to indicate the UE to receive, according to a transmission mode indicated by the indication identifier, an available state of a reference signal. Thus, in the examples of the present disclosure, the base station may transmit the available state of the reference signal to the UE through a variety of transmission modes, achieving high flexibility. Moreover, by transmitting the available state of the reference signal to the UE, the UE may synchronize with a network in a time-frequency domain according to the reference signal, in case where the available state of the reference signal is available, which can shorten the wake-up cycle, reduce power consumption, and save energy and power.

Figure 5:
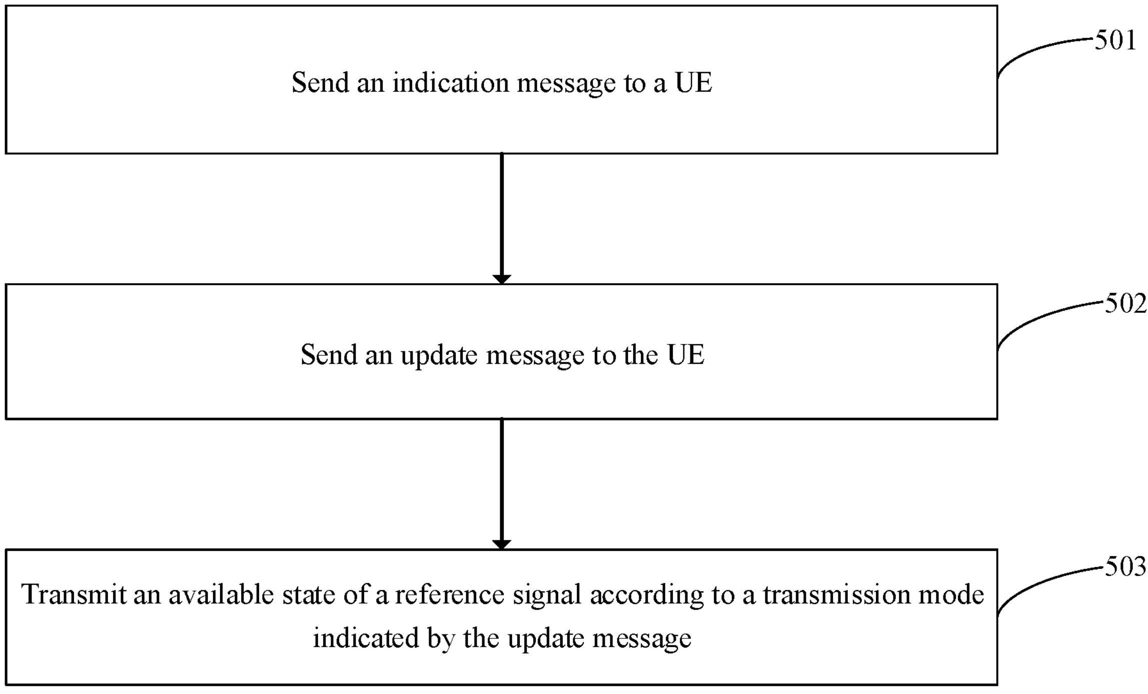
FIG. 5 is a schematic flowchart of a method for configuring indication information provided in yet another example of the present disclosure.

FIG. 5 is a schematic flowchart of a method for configuring indication information provided in yet another example of the present disclosure, which is performed by a base station. As shown in FIG. 5, the method for configuring indication information may include steps 501, 502, and 503.

Step 501 includes sending an indication message to a UE. The indication message may include an indication identifier, and the indication identifier is used to indicate to the UE to receive, according to a transmission mode indicated by the indication identifier, an available state of a reference signal.

In an example of the present disclosure, a detailed description about the UE, the indication message, the transmission mode, and the indication identifier may refer to the above examples, which will not be described again in this example of the present disclosure.

Step 502 includes sending an update message to the UE, where a transmission mode indicated by the update message is different from the transmission mode indicated by the indication message.

In an example of the present disclosure, the base station, after determining the transmission mode for the available state of the reference signal, may update the transmission mode for the available state of the reference signal to obtain a new transmission mode for the available state of the reference signal.

In an example of the present disclosure, by updating the indication message in step 501 to obtain the update message, the transmission mode for the available state of the reference signal may be updated. The transmission mode indicated by the update message is different from the transmission mode indicated by the indication message.

For example, in an example of the present disclosure, the transmission mode indicated by the indication message in step 501 is the third transmission mode, and the transmission mode indicated by the update message may be the first transmission mode, i.e., the transmission mode is updated from the third transmission mode to the first transmission mode. In an example of the present disclosure, the transmission mode indicated by the indication message in step 501 is the third transmission mode, and the transmission mode indicated by the update message may be the second transmission mode, i.e., the transmission mode is updated from the third transmission mode to the second transmission mode.

Step 503 includes transmitting the available state of the reference signal according to the transmission mode indicated by the update message.

It should be noted that, in an example of the present disclosure, the transmission mode for the available state of the reference signal may be updated for reference signals of different cycles, such that the available states of the reference signals of different cycles may be transmitted through different transmission modes.

In summary, in the method for configuring indication information provided in the example of the present disclosure, the base station may send an indication message to the UE, the indication message including an indication identifier, and the indication identifier being used to indicate the UE to receive, according to a transmission mode indicated by the indication identifier, an available state of a reference signal. Thus, in the examples of the present disclosure, the base station may transmit the available state of the reference signal to the UE through a variety of transmission modes, and the transmission modes may also be updated, achieving high flexibility. Moreover, by transmitting the available state of the reference signal to the UE, the UE may synchronize with a network in a time-frequency domain according to the reference signal, in a case where the available state of the reference signal is available, which can shorten the wake-up cycle, reduce power consumption, and save energy and power.

FIG. 6 is a schematic flowchart of a method for receiving indication information provided in yet another example of the present disclosure, which is performed by a UE. As shown in FIG. 6, the method for receiving indication information may include steps 601 and 602.

Step 601 includes receiving an indication message sent by a base station.

In an example of the present disclosure, the indication message may be included in a system message, i.e., the UE may receive the indication message sent by the base station through the system message.

In an example of the present disclosure, the indication message may include an indication identifier, and the indication identifier may be used to indicate a transmission mode for transmitting an available state of a reference signal by the base station, so that the UE may receive the available state of the reference signal according to the transmission mode indicated by the indication identifier sent by the base station, and the UE may be synchronized with a network in a time-frequency domain according to the available state of the reference signal. The available state of the reference signal may include whether the reference signal is available or unavailable, and the UE may synchronize with the network in the time-frequency domain according to the reference signal in a case that the reference signal is available. In an example of the present disclosure, the reference signal may include at least one of a TRS, a CSI-RS, or a secondary synchronization signal (SSS).

In an example of the present disclosure, the transmission mode indicated by the indication identifier may include the following transmission modes.

In a first transmission mode, the available state of the reference signal is transmitted through DCI signaling alone. In an example of the present disclosure, the DCI signaling may include paging DCI.

In an example of the present disclosure, transmitting the available state of the reference signal through the DCI signaling may include: indicating the available state of the reference signal by using a first indication bit included in the DCI signaling, so that the available state of the reference signal can be determined by the first indication bit in the DCI signaling after the UE receives the DCI signaling sent by the base station.

In an example of the present disclosure, the first indication bit may include n bits, n being an integer, and $n \geq 1$.

For example, in an example of the present disclosure, the first indication bit may be one bit. In an example of the present disclosure, in a case that the first indication bit is 1, the first indication bit may indicate that the available state of the reference signal is available; and in a case that the first indication bit is 0, the first indication bit may indicate that the available state of the reference signal is unavailable.

In a second transmission mode, the available state of the reference signal is transmitted through an SIB alone.

In an example of the present disclosure, transmitting the available state of the reference signal through the SIB may include: indicating the available state of the reference signal by using a second indication bit included in a system message, so that the available state of the reference signal can be determined through the second indication bit in the system message after the UE receives the system message sent by the base station.

In an example of the present disclosure, the second indication bit may include n bits, n being an integer, and $n \geq 1$.

For example, in an example of the present disclosure, the second indication bit may be one bit. In an example of the present disclosure, in a case that the second indication bit is 1, the second indication bit may indicate that the available state of the reference signal is available; and in a case that the second indication bit is 0, the second indication bit may indicate that the available state of the reference signal is unavailable.

In an example of the present disclosure, in a case that the transmission mode indicated by the base station through the system message is the second transmission mode (i.e., the available state of the reference signal is transmitted through the SIB), the system message used to indicate the transmission mode and the system message used to indicate the available state of the reference signal may be the same system message, i.e., the system message used to indicate the transmission mode may also be used to indicate the available state of the reference signal. Accordingly, after the UE receives the system message sent by the base station, the UE may first determine, according to the system message, the transmission mode for the available state of the reference signal transmitted by the base station as the second transmission mode, and then determine the available state of the reference signal from the system message.

Further, in another example of the present disclosure, in a case that the transmission mode indicated by the base station through the system message is the second transmission mode, the system message used to indicate the transmission mode and the system message used to indicate the available state of the reference signal may be different system messages.

In a third transmission mode, the available state of the reference signal is transmitted through the DCI signaling and the SIB.

In a case that the transmission mode indicated by the indication identifier is the third transmission mode, in an example of the present disclosure, the available state of the reference signal transmitted through the DCI signaling and the available state of the reference signal transmitted through the SIB may be the same. In another example of the present disclosure, the available state of the reference signal transmitted through the DCI signaling and the available state of the reference signal transmitted through the SIB may be different. Moreover, in an example of the present disclosure, in a case that the available state of the reference signal transmitted through the DCI signaling and the available state of the reference signal transmitted through the SIB are different, the available state of the reference signal indicated by a signal, which is sent later in the DCI signaling and the SIB, prevails. For example, in a case where the DCI signaling is sent after the SIB, the available state of the reference signal transmitted through the DCI signaling prevails.

Further, in an example of the present disclosure, the indication identifier may include n bits, n being an integer, and n≥1.

Moreover, in an example of the present disclosure, the indication identifier may include two bits, i.e., n=2, and a method for indicating a transmission mode by an indication identifier may include: the indication identifier is 01, and the transmission mode indicated by the indication identifier is the first transmission mode; the indication identifier is 10, and the transmission mode indicated by the indication identifier is the second transmission mode; and the indication identifier is 00, and the transmission mode indicated by the indication identifier is the third transmission mode.

In another example of the present disclosure, the indication identifier may include one bit, i.e., n=1, and a method for indicating a transmission mode by an indication identifier may include: the indication identifier is 1, and the transmission mode indicated by the indication identifier is the first transmission mode or the second transmission mode; and the indication identifier is 0, and the transmission mode indicated by the indication identifier is the third transmission mode.

In an example of the present disclosure, in a case that the transmission mode indicated by the indication identifier sent by the base station to the UE is the first transmission mode or the second transmission mode, it means that the base station may transmit the available state of the reference signal by selecting a transmission mode from either the first transmission mode or the second transmission mode.

In an example of the present disclosure, in a case that the transmission mode indicated by the indication identifier received by the UE is either the first transmission mode or the second transmission mode, since the system message is generally sent before the DCI signaling, the UE may determine, according to whether the system message received by the UE indicates the available state of the reference signal, whether the transmission mode indicated by the indication identifier is the first transmission mode or the second transmission mode. In a case that the system message received by UE indicates the available state of the reference signal, it means that the base station transmits the available state of the reference signal through the second transmission mode; and in a case that the system message received by the UE does not indicate the available state of the reference signal, it means that the base station transmits the available state of the reference signal through the first transmission mode, and the UE may determine the available state of the reference signal according to subsequently received DCI signaling.

Further, in an example of the present disclosure, the base station, after sending the indication message to the UE, may send the available state of the reference signal to the UE according to the transmission mode indicated by the indication identifier in the indication message.

It should be noted that, in an example of the present disclosure, in a case that the base station transmits the available state of the reference signal through the DCI signaling (e.g., paging DCI signaling), the base station may send the available state of the reference signal to the UE in an idle state through the DCI signaling.

In another example of the present disclosure, in a case that the base station transmits the available state of the reference signal through the SIB, the base station may send the available state of the reference signal to the UE in a connected state through the SIB.

Step 602 includes receiving the available state of the reference signal according to the transmission mode indicated by the indication identifier.

In summary, in the method for receiving indication information provided in the example of the present disclosure, the base station may send an indication message to the UE, the indication message including an indication identifier, and the indication identifier being used to indicate the UE to receive, according to a transmission mode indicated by the indication identifier, an available state of a reference signal. Thus, in the examples of the present disclosure, the base station may transmit the available state of the reference signal to the UE through a variety of transmission modes, achieving high flexibility. Moreover, by transmitting the available state of the reference signal to the UE, the UE may synchronize with a network in a time-frequency domain according to the reference signal in a case that the available state of the reference signal is available, which can shorten the wake-up cycle, reduce power consumption, and save energy and power.

FIG. 7 is a schematic flowchart of a method for receiving indication information provided in yet another example of the present disclosure, which is performed by a UE. As shown in FIG. 7, the method for receiving indication information may include steps 701 and 702.

Step 701 includes receiving an indication message sent by a base station, where the indication message may include an indication identifier, and the indication identifier is used to indicate the UE to receive, according to a first transmission mode, an available state of a reference signal.

In an example of the present disclosure, detailed description about the indication message, the indication identifier, the first transmission mode and the reference signal may refer to the above examples, which will not be described again in this example of the present disclosure.

Step 702 includes receiving the available state of the reference signal according to the first transmission mode indicated by the indication identifier.

In summary, in the method for receiving indication information provided in the example of the present disclosure, the base station may send an indication message to the UE, the indication message including an indication identifier, and the indication identifier being used to indicate the UE to receive, according to a transmission mode indicated by the indication identifier, an available state of a reference signal. Thus, in the examples of the present disclosure, the base station may transmit the available state of the reference signal to the UE through a variety of transmission modes, achieving high flexibility. Moreover, by transmitting the available state of the reference signal to the UE, the UE may synchronize with a network in a time-frequency domain according to the reference signal in a case that the available state of the reference signal is available, which can shorten the wake-up cycle, reduce power consumption, and save energy and power.

Figure 8:
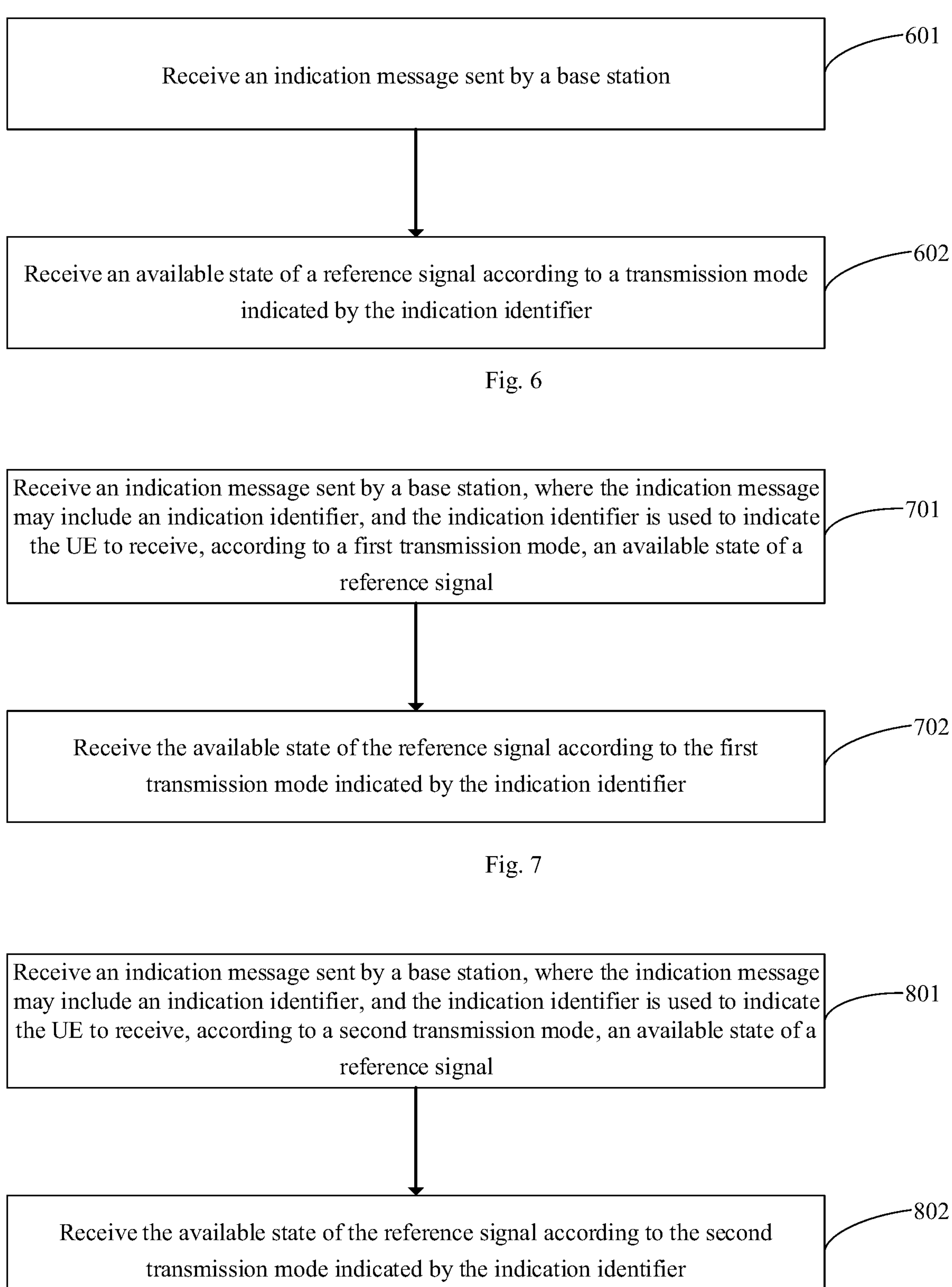
FIG. 8 is a schematic flowchart of a method for receiving indication information provided in yet another example of the present disclosure.

FIG. 8 is a schematic flowchart of a method for receiving indication information provided in yet another example of the present disclosure, which is performed by a UE. As shown in FIG. 8, the method for receiving indication information may include steps 801 and 802.

Step 801 includes receiving an indication message sent by a base station, where the indication message may include an indication identifier, and the indication identifier is used to indicate the UE to receive, according to a second transmission mode, an available state of a reference signal.

In an example of the present disclosure, detailed description about the indication message, the indication identifier, the second transmission mode and the reference signal may refer to the above examples, which will not be described again in this example of the present disclosure.

Step 802 includes receiving the available state of the reference signal according to the second transmission mode indicated by the indication identifier.

In summary, in the method for receiving indication information provided in the example of the present disclosure, the base station may send an indication message to the UE, the indication message including an indication identifier, and the indication identifier being used to indicate the UE to receive, according to a transmission mode indicated by the indication identifier, an available state of a reference signal. Thus, in the examples of the present disclosure, the base station may transmit the available state of the reference signal to the UE through a variety of transmission modes, achieving high flexibility. Moreover, by transmitting the available state of the reference signal to the UE, the UE may synchronize with a network in a time-frequency domain according to the reference signal in case the available state of the reference signal is available, which can shorten the wake-up cycle, reduce power consumption, and save energy and power.

Figure 9:
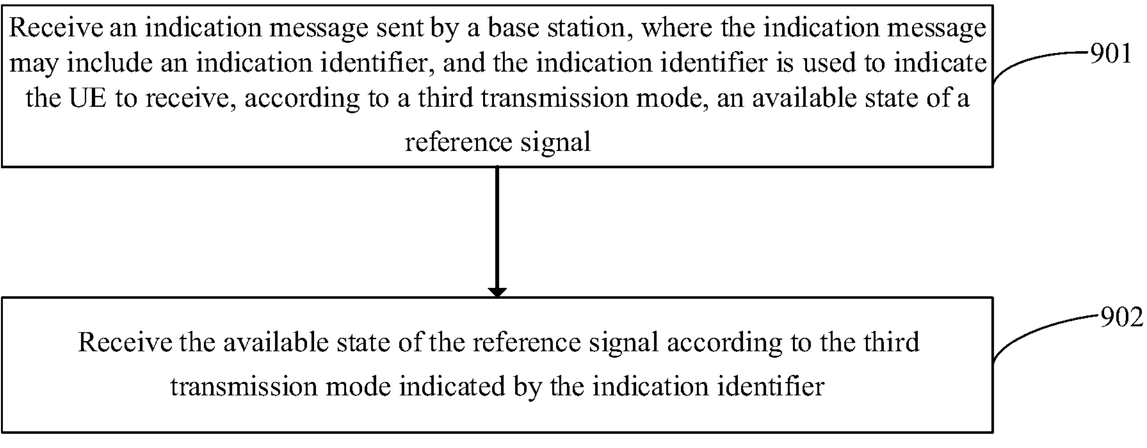
FIG. 9 is a schematic flowchart of a method for receiving indication information provided in yet another example of the present disclosure.

FIG. 9 is a schematic flowchart of a method for receiving indication information provided in yet another example of the present disclosure, which is performed by a UE. As shown in FIG. 9, the method for receiving indication information may include steps 901 and 902.

Step 901 includes receiving an indication message sent by a base station, where the indication message may include an indication identifier, and the indication identifier is used to indicate the UE to receive, according to a third transmission mode, an available state of a reference signal.

In an example of the present disclosure, detailed description about the indication message, the indication identifier, the third transmission mode and the reference signal may refer to the above examples, which will not be described again in this example of the present disclosure.

Step 902 includes receiving the available state of the reference signal according to the third transmission mode indicated by the indication identifier.

In summary, in the method for receiving indication information provided in the example of the present disclosure, the base station may send an indication message to the UE, the indication message including an indication identifier, and the indication identifier being used to indicate the UE to receive, according to a transmission mode indicated by the indication identifier, an available state of a reference signal. Thus, in the examples of the present disclosure, the base station may transmit the available state of the reference signal to the UE through a variety of transmission modes, achieving high flexibility. Moreover, by transmitting the available state of the reference signal to the UE, the UE may synchronize with a network in a time-frequency domain according to the reference signal in case the available state of the reference signal is available, which can shorten the wake-up cycle, reduce power consumption, and save energy and power.

Figure 10:
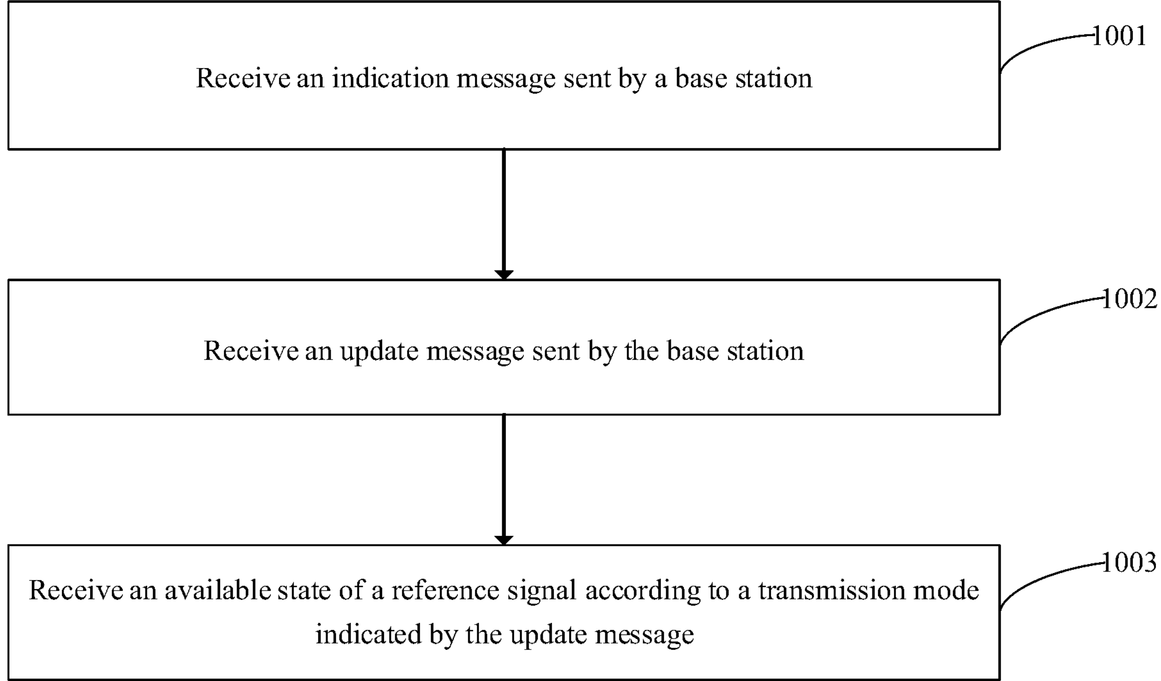
FIG. 10 is a schematic flowchart of a method for receiving indication information provided in yet another example of the present disclosure.

FIG. 10 is a schematic flowchart of a method for receiving indication information provided in yet another example of the present disclosure, which is performed by a UE. As shown in FIG. 10, the method for receiving indication information may include steps 1001, 1002, and 1003.

Step 1001 includes receiving an indication message sent by a base station, where the indication message may include an indication identifier, and the indication identifier is used to indicate a transmission mode for an available state of a reference signal.

In an example of the present disclosure, a detailed description of the indication message, the indication identifier, the transmission mode, and the reference signal may refer to the above examples, which will not be described again in this example of the present disclosure.

Step 1002 includes receiving an update message sent by the base station, where a transmission mode indicated by the update message is different from the transmission mode indicated by the indication message.

In an example of the present disclosure, the base station may update the transmission mode for the available state of the reference signal. In an example of the present disclosure, the base station may obtain the update message by updating the indication message, and make a transmission mode indicated by the update message different from the transmission mode indicated by the indication message, so as to update the transmission mode for the available state of the reference signal.

In an example of the present disclosure, the UE, after receiving the update message, may receive the available state of the reference signal according to a new transmission mode indicated in the update message.

For example, in an example of the present disclosure, the transmission mode indicated by the indication message in step 1001 is the third transmission mode, and the transmission mode indicated by the update message is the first transmission mode, so the UE may update the transmission mode from the third transmission mode to the first transmission mode, and receive the available state of the reference signal through the first transmission mode. In an example of the present disclosure, the transmission mode indicated by the indication message in step 1001 is the third transmission mode and the transmission mode indicated by the update message is the second transmission mode, so the UE may update the transmission mode from the third transmission mode to the second transmission mode, and receive the available state of the reference signal through the second transmission mode.

Step 1003 includes receiving the available state of the reference signal according to the transmission mode indicated by the update message.

In summary, in the method for receiving indication information provided in the example of the present disclosure, the base station may send an indication message to the UE, the indication message including an indication identifier, and the indication identifier being used to indicate the UE to receive, according to a transmission mode indicated by the indication identifier, an available state of a reference signal. Thus, in the examples of the present disclosure, the base station may transmit the available state of the reference signal to the UE through a variety of transmission modes, and the transmission modes may be updated, achieving high flexibility. Moreover, by transmitting the available state of the reference signal to the UE, the UE may synchronize with a network in a time-frequency domain according to the reference signal in case the available state of the reference signal is available, which can shorten the wake-up cycle, reduce power consumption, and save energy and power.

In addition, it should be noted that the methods in the examples of the present disclosure may also be applied to a Fringe Field Switching (FFS) scenario. The FFS scenario may include a case of determining whether to restrict RS to TRS-alone.

Figure 11:
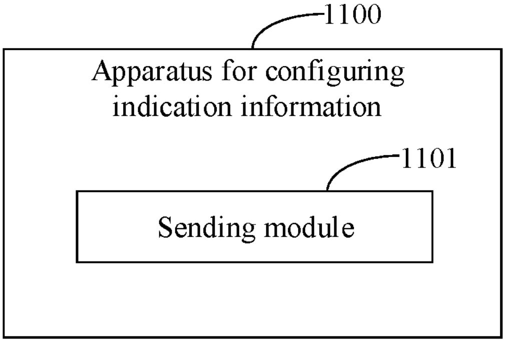
FIG. 11 is a schematic structural diagram of an apparatus for configuring indication information provided in an example of the present disclosure.

FIG. 11 is a schematic structural diagram of an apparatus for configuring indication information 1100 provided in an example of the present disclosure. As shown in FIG. 11, the apparatus 1100 may include a sending module 1101.

The sending module 1101 is used to send an indication message to a UE, the indication message including an indication identifier, and the indication identifier being used to indicate the UE to receive, according to a transmission mode indicated by the indication identifier, an available state of a reference signal.

In summary, in the apparatus for configuring indication information 1100 provided in the example of the present disclosure, the base station may send an indication message to the UE, the indication message including an indication identifier, and the indication identifier being used to indicate the UE to receive, according to a transmission mode indicated by the indication identifier, an available state of a reference signal. Thus, in the examples of the present disclosure, the base station may transmit the available state of the reference signal to the UE through a variety of transmission modes, achieving high flexibility. Moreover, by transmitting the available state of the reference signal to the UE, the UE in an idle state can shorten the wake-up cycle according to the reference signal, thus reducing power consumption, and saving energy and power.

In an example of the present disclosure, the indication message is included in a system message.

Further, in another example of the present disclosure, the transmission modes include at least one of: a first transmission mode: transmitting the available state of the reference signal through downlink control information (DCI) signaling alone; a second transmission mode: transmitting the available state of the reference signal through a system information block (SIB) alone; or a third transmission mode: transmitting the available state of the reference signal through the DCI signaling and the SIB.

Further, in another example of the present disclosure, the indication identifier includes n bits, n being an integer, and $n \geq 1$.

Further, in another example of the present disclosure, $n=2$; and the indication identifier is 01, and the transmission mode indicated by the indication identifier is the first transmission mode; the indication identifier is 10, and the transmission mode indicated by the indication identifier is the second transmission mode; and the indication identifier is 00, and the transmission mode indicated by the indication identifier is the third transmission mode.

Further, in another example of the present disclosure, $n=1$; and the indication identifier is 1, and the transmission mode indicated by the indication identifier is the first transmission mode or the second transmission mode; and the indication identifier is 0, and the transmission mode indicated by the indication identifier is the third transmission mode.

Further, in another example of the present disclosure, the apparatus 1100 further includes: an updating module, used to send an update message to the UE, where the transmission mode indicated by the update message is different from the transmission mode indicated by the indication message.

Further, in another example of the present disclosure, the apparatus 1100 further includes: a processing module, used to send the available state of the reference signal to the UE according to the transmission mode indicated by the indication identifier.

Further, in an example of the present disclosure, in a case that the transmission mode indicated by the indication identifier is the first transmission mode, the sending module 1101 is further used to: send the available state of the reference signal to the UE in an idle state.

Further, in another example of the present disclosure, in a case that the transmission mode indicated by the indication identifier is the second transmission mode, the sending module 1101 is further used to: send the available state of the reference signal to the UE in a connected state.

Further, in another example of the present disclosure, the reference signal includes at least one of a tracking reference signal (TRS), a channel state information-reference signal (CSI-RS), or a secondary synchronization signal (SSS).

Figure 12:
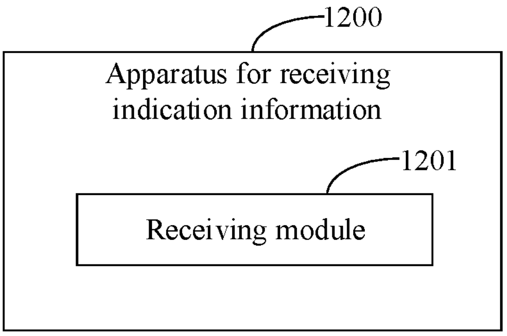
FIG. 12 is a schematic structural diagram of an apparatus for receiving indication information provided in another example of the present disclosure.

FIG. 12 is a schematic structural diagram of an apparatus for receiving indication information provided in another example of the present disclosure. As shown in FIG. 12, the apparatus 1200 may include a receiving module 1201.

The receiving module 1201 is used to receive an indication message sent by a base station, the indication message including an indication identifier, and the indication identifier being used to indicate a transmission mode for an available state of a reference signal; and receive the available state of the reference signal according to the transmission mode indicated by the indication identifier.

In summary, in the apparatus for receiving indication information 1200 provided in the example of the present disclosure, the base station may send an indication message to the UE, the indication message including an indication identifier, and the indication identifier being used to indicate the UE to receive, according to a transmission mode indicated by the indication identifier, an available state of a reference signal. Thus, in the examples of the present disclosure, the base station may transmit the available state of the reference signal to the UE through a variety of transmission modes, achieving high flexibility. Moreover, by transmitting the available state of the reference signal to the UE, the UE in an idle state can shorten the wake-up cycle according to the reference signal, thus reducing power consumption, and saving energy and power.

In an example of the present disclosure, the indication message is included in a system message.

Further, in another example of the present disclosure, the transmission modes include at least one of: a first transmission mode: transmitting the available state of the reference signal through a DCI signaling alone; a second transmission mode: transmitting the available state of the reference signal through an SIB alone; or a third transmission mode: transmitting the available state of the reference signal through the DCI signaling and the SIB.

Further, in another example of the present disclosure, the indication identifier includes n bits, n being an integer, and n≥1.

Further, in another example of the present disclosure, n=2; and the indication identifier is 01, and the transmission mode indicated by the indication identifier is the first transmission mode; the indication identifier is 10, and the transmission mode indicated by the indication identifier is the second transmission mode; and the indication identifier is 00, and the transmission mode indicated by the indication identifier is the third transmission mode.

Further, in another example of the present disclosure, n=1; and the indication identifier is 1, and the transmission mode indicated by the indication identifier is the first transmission mode or the second transmission mode; and the indication identifier is 0, and the transmission mode indicated by the indication identifier is the third transmission mode.

Further, in another example of the present disclosure, in a case that the transmission mode indicated by the indication identifier is the first transmission mode or the second transmission mode, the apparatus 1200 further includes: a judging module, used to judge whether a system message received by the UE indicates the available state of the reference signal; and a determining module, used to determine the transmission mode indicated by the indication identifier as the first transmission mode in a case that the system message does not indicate the available state of the reference signal; and determine the transmission mode indicated by the indication identifier as the second transmission mode in a case that the system message indicates the available state of the reference signal.

Further, in another example of the present disclosure, the apparatus 1200 further includes: an updating module, used to receive an update message sent by the base station, where a transmission mode indicated by the update message is different from the transmission mode indicated by the indication message.

Further, in another example of the present disclosure, the apparatus 1200 further includes: a processing module, used to receive, according to the transmission mode indicated by the indication identifier, the available state of the reference signal sent by the base station.

Further, in another example of the present disclosure, the reference signal includes at least one of a TRS, a CSI-RS, or a SSS.

In order to implement the above examples, the present disclosure further provides a non-transitory computer readable storage medium.

An example of the present disclosure provides a non-transitory computer readable storage medium which stores an executable program, the executable program, when being executed by a processor, implementing the methods shown in any one of FIGS. 1 to 5 or FIGS. 6 to 10.

In order to implement the above examples, the present disclosure further provides a computer program product which includes a computer program, the computer program, when executed by a processor, implements the methods shown in any one of FIGS. 1 to 5 or FIGS. 6 to 10.

In addition, in order to implement the above examples, the present disclosure further provides a computer program, the computer program, when executed by a processor, implements the methods shown in any one of FIGS. 1 to 5 or FIGS. 6 to 10.

Figure 13:
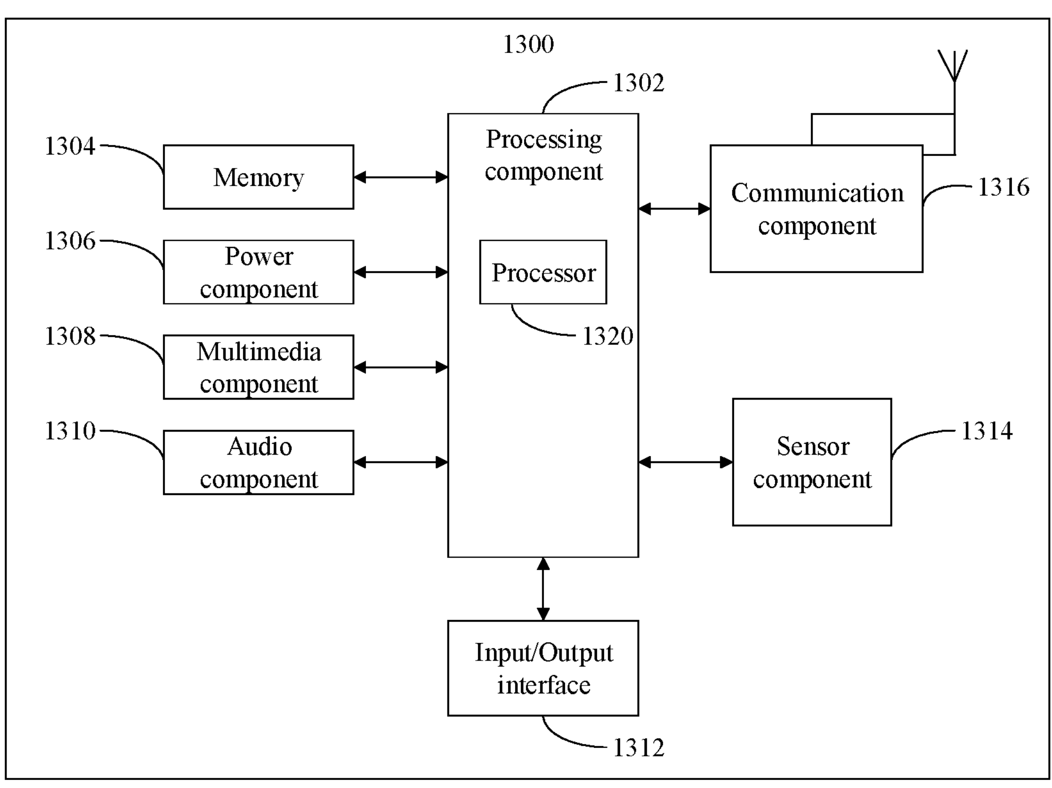
FIG. 13 is a block diagram of a UE provided in an example of the present disclosure.

FIG. 13 is a block diagram of UE 1300 provided in an example of the present disclosure. For example, the UE 1300 may be a mobile phone, a computer, a digital broadcast terminal device, a message transceiver device, a game console, a tablet device, a medical device, a fitness device, a personal digital assistant, or the like.

Referring to FIG. 13, the UE 1300 may include at least one of the following components: a processing component 1302, a memory 1304, a power component 1306, a multimedia component 1308, an audio component 1310, an input/output (I/O) interface 1312, a sensor component 1314, or a communication component 1316.

The processing component 1302 typically controls overall operations of the UE 1300, such as the operations associated with display, telephone calls, data communications, camera operations, and recording operations. The processing component 1302 may include at least one processor 1320 to execute instructions, so as to complete all or part of the steps in the above methods. In addition, the processing component 1302 may include at least one module which facilitates the interaction between the processing component 1302 and other components. For example, the processing component 1302 may include a multimedia module to facilitate the interaction between the multimedia component 1308 and the processing component 1302.

The memory 1304 is used to store various types of data, so as to support operations on the UE 1300. Examples of such data include instructions for any application or method operated on the UE 1300, contact data, phonebook data, messages, pictures, video, etc. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk or an optical disk.

The power component 1306 provides power to various components of the UE 1300. The power component 1306 may include a power management system, one or more power sources, and any other components associated with the generation, management, and distribution of power of the UE 1300.

The multimedia component 1308 includes a screen providing an output interface between the UE 1300 and a user. In some examples, the screen may include a liquid crystal display (LCD) and a touch panel (TP). In a case that the screen includes a touch panel, the screen may be implemented as a touch screen to receive input signals from the user. The touch panel includes at least one touch sensor to sense touches, slips, and gestures on the touch panel. The touch sensors may not only sense a boundary of a touch or slip action, but also measure a wake-up time and a pressure associated with the touch or slip action. In some examples, the multimedia component 1308 includes a front camera and/or a rear camera. The front camera and/or the rear camera may receive an external multimedia datum while the UE 1300 is in an operation mode, such as a photographing mode or a video mode. Each of the front and rear cameras may be a fixed optical lens system or have focus and optical zoom capability.

The audio component 1310 is used to output and/or input audio signals. For example, the audio component 1310 includes a microphone (MIC) which is used to receive an external audio signal in a case that the UE 1300 is in an operation mode, such as a call mode, a recording mode, and a voice recognition mode. The received audio signal may be further stored in the memory 1304 or transmitted via the communication component 1916. In some examples, the audio component 1310 further includes a speaker for outputting audio signals.

The I/O interface 1312 provides an interface between the processing component 1302 and a peripheral interface module, which may be a keyboard, a click wheel, buttons etc. These buttons may include, but are not limited to, a home button, a volume button, a starting button, and a locking button.

The sensor component 1314 includes at least one sensor for providing state assessments of various aspects of the UE 1300. For example, the sensor component 1314 may detect a turn-on/turn-off state of the UE 1300, relative positioning of components, e.g., the display and the keypad, of the UE 1300, a change in position of the UE 1300 or a component of the UE 1300, presence or absence of a user's contact with the UE 1300, an orientation or an acceleration/deceleration of the UE 1300, and a change in the temperature of the UE 1300. The sensor component 1314 may include a proximity sensor, which is used to detect the presence of nearby objects without any physical contact. The sensor component 1314 may also include a light sensor, such as a CMOS or CCD image sensor, for use in imaging applications. In some examples, the sensor component 1314 may also include an accelerometer sensor, a gyroscope sensor, a magnetic sensor, a pressure sensor, or a temperature sensor.

The communication component 1316 is used to facilitate communication, wired or wirelessly, between the UE 1300 and other devices. The UE 1300 may access a wireless network based on a communication standard, such as Wi-Fi, 2G, or 3G, or a combination thereof. In an example, the communication component 1316 receives a broadcast signal or broadcast associated information from an external broadcast management system via a broadcast channel. In an example, the communication component 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an example, the UE 1300 may be implemented by at least one of application specific integrated circuit (ASIC), digital signal processor (DSP), digital signal processing device (DSPD), programmable logic device (PLD), field programmable gate array (FPGA), controller, micro-controller, microprocessor, or other electronic components, for performing the above methods.

Figure 14:
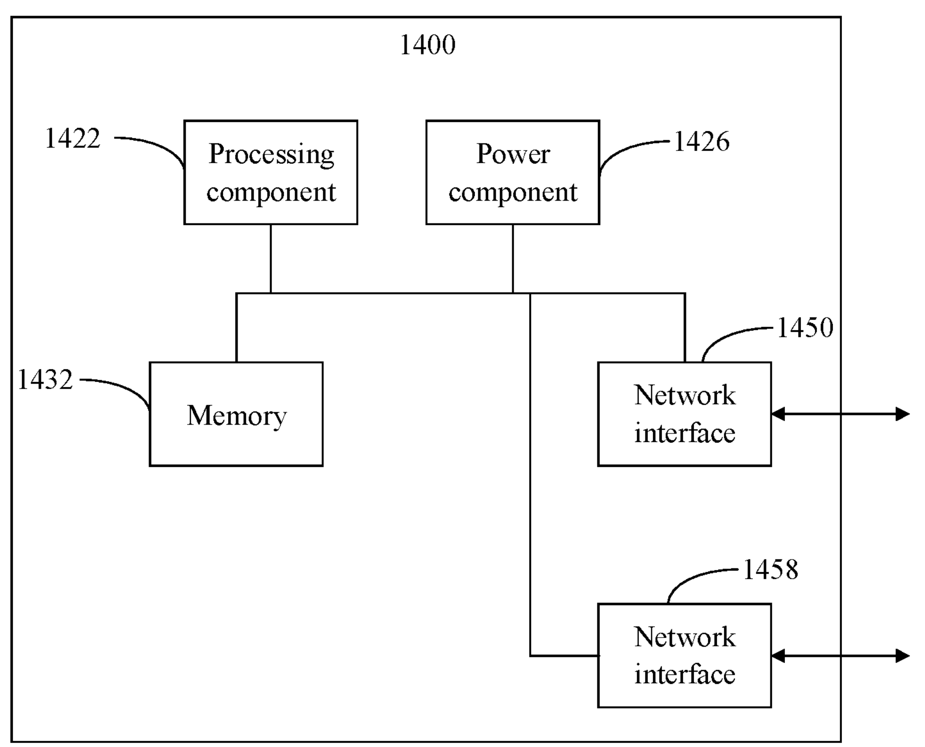
FIG. 14 is a block diagram of a base station provided in an example of the present disclosure.

FIG. 14 is a block diagram of a base station 1400 provided in an example of the present application. For example, the base station 1400 may be provided as a base station. Referring to FIG. 14, the base station 1400 includes a processing component 1422 which further includes one or more processors (not shown), and memory resources represented by a memory 1432 for storing instructions such as applications executable by the processing component 1422. The applications stored in the memory 1432 may include one or more modules, each corresponding to a set of instructions. In addition, the processing component 1422 is used to execute instructions, so as to perform any method, e.g., the method shown in FIG. 1, applied in the base station described in the above methods.

The base station 1400 may also include a power component 1426 which is used to perform power management of the base station 1400, a wired or wireless network interface 1450 which is used to connect the base station 1400 to a network, and an input/output (I/O) interface 1458. The base station 1400 may operate an operating system, such as Windows Server™, Mac OS X™, Unix™, Linux™, FreeBSD™ or the like, stored in the memory 1432.

Other examples of the present disclosure will be apparent to those skilled in the art from consideration of the specification and practice of the present disclosure. The present disclosure is intended to cover any variations, uses, or adaptations of the present disclosure, following the general principles thereof and including common knowledge or commonly used technical measures which are not disclosed in the present disclosure. The specification and examples are to be considered as illustrative, and the protection scope of the present disclosure is defined by the following claims.

It is to be understood that the present disclosure is not limited to the construction that has been described above and illustrated in the accompanying drawings, and that various modifications and changes can be made without departing from the scope thereof. It is intended that the scope of the present disclosure is defined by the appended claims.

The invention claimed is:

1. A method for configuring indication information, performed by a base station, the method comprising:

sending an indication message to a user equipment (UE), the indication message comprising an indication identifier, and the indication identifier being used to indicate the UE to receive, according to a transmission mode indicated by the indication identifier, an available state of a reference signal, wherein the transmission mode comprises:

a third transmission mode: transmitting the available state of the reference signal through downlink control information (DCI) signaling and a system information block (SIB), wherein in a case that the available state of the reference signal transmitted through the DCI signaling is different from the available state of the reference signal transmitted through the SIB, the available state of the reference signal indicated by a later transmitted one of the DCI signaling and the SIB prevails.

2. The method of claim 1, wherein the indication message is comprised in a system message.

3. The method of claim 1, wherein the transmission mode further comprises at least one of:

a first transmission mode: transmitting the available state of the reference signal through the DCI signaling alone; or a second transmission mode: transmitting the available state of the reference signal through the SIB alone.

4. The method of claim 1, wherein the indication identifier comprises n bits, n being an integer, and n≥1.

5. The method of claim 4, wherein n=2; and on a condition that the indication identifier is 01, the transmission mode indicated by the indication identifier is the first transmission mode;

on a condition that the indication identifier is 10, the transmission mode indicated by the indication identifier is the second transmission mode; and on a condition that the indication identifier is 00, the transmission mode indicated by the indication identifier is the third transmission mode.

6. The method of claim 4, wherein n=1; and on a condition that the indication identifier is 1, the transmission mode indicated by the indication identifier is the first transmission mode or the second transmission mode; and on a condition that the indication identifier is 0, the transmission mode indicated by the indication identifier is the third transmission mode.

7. The method of claim 1, further comprising at least one of:

sending an update message to the UE, wherein a transmission mode indicated by the update message is different from the transmission mode indicated by the indication message; or sending the available state of the reference signal to the UE according to the transmission mode indicated by the indication identifier.

8. The method of claim 7, wherein sending the available state of the reference signal to the UE comprises at least one of:

the transmission mode indicated by the indication identifier being the first transmission mode, and sending the available state of the reference signal to the UE in an idle state; or the transmission mode indicated by the indication identifier being the second transmission mode, and sending the available state of the reference signal to the UE in a connected state.

9. The method of claim 1, wherein the reference signal comprises at least one of a tracking reference signal (TRS), a channel state information-reference signal (CSI-RS), or a secondary synchronization signal (SSS).

10. A base station, comprising a transceiver; a memory; and a processor communicatively connected to the transceiver and the memory respectively, used to control the transceiver to receive and transmit wireless signals by executing a computer-executable instruction stored on the memory, and capable of implementing the method of claim 1.

11. A method for receiving indication information, performed by a user equipment (UE), the method comprising:

receiving an indication message sent by a base station, the indication message comprising an indication identifier, and the indication identifier being used to indicate a transmission mode for an available state of a reference signal; and receiving the available state of the reference signal according to the transmission mode indicated by the indication identifier, wherein the transmission mode comprises:

a third transmission mode: transmitting the available state of the reference signal through downlink control information (DCI) signaling and a system information block (SIB), wherein in a case that the available state of the reference signal transmitted through the DCI signaling is different from the available state of the reference signal transmitted through the SIB, the available state of the reference signal indicated by a later transmitted one of the DCI signaling and the SIB prevails.

12. The method of claim 11, wherein the indication message is comprised in a system message.

13. The method of claim 11, wherein the transmission mode further comprises at least one of:

a first transmission mode: transmitting the available state of the reference signal through the DCI signaling alone; or a second transmission mode: transmitting the available state of the reference signal through the SIB alone.

14. The method of claim 11, wherein the indication identifier comprises n bits, n being an integer, and n≥1.

15. The method of claim 14, wherein n=2; and on a condition that the indication identifier is 01, the transmission mode indicated by the indication identifier is the first transmission mode;

on a condition that the indication identifier is 10, the transmission mode indicated by the indication identifier is the second transmission mode; and on a condition that the indication identifier is 00, the transmission mode indicated by the indication identifier is the third transmission mode.

16. The method of claim 14, wherein n=1; and on a condition that the indication identifier is 1, the transmission mode indicated by the indication identifier is the first transmission mode or the second transmission mode; and on a condition that the indication identifier is 0, the transmission mode indicated by the indication identifier is the third transmission mode.

17. The method of claim 16, wherein the transmission mode indicated by the indication identifier is the first transmission mode or the second transmission mode; the method further comprises:

determining whether a system message received by the UE indicates the available state of the reference signal;

determining the transmission mode indicated by the indication identifier as the first transmission mode in response to the system message not indicating the available state of the reference signal; and determining the transmission mode indicated by the indication identifier as the second transmission mode in response to the system message indicating the available state of the reference signal.

18. The method of claim 11, further comprising at least one of:

receiving an update message sent by the base station, wherein a transmission mode indicated by the update message is different from the transmission mode indicated by the indication message; or receiving, according to the transmission mode indicated by the indication identifier, the available state of the reference signal sent by the base station.

19. The method of claim 11, wherein the reference signal comprises at least one of a tracking reference signal (TRS), a channel state information-reference signal (CSI-RS), or a secondary synchronization signal (SSS).

20. A user equipment, comprising a transceiver; a memory; and a processor communicatively connected to the transceiver and the memory respectively, used to control the transceiver to receive and transmit wireless signals by executing a computer-executable instruction stored on the memory, and capable of:

receiving an indication message sent by a base station, the indication message comprising an indication identifier, and the indication identifier being used to indicate a transmission mode for an available state of a reference signal; and receiving the available state of the reference signal according to the transmission mode indicated by the indication identifier, wherein the transmission mode comprises:

a third transmission mode: transmitting the available state of the reference signal through downlink control information (DCI) signaling and a system information block (SIB), wherein in a case that the available state of the reference signal transmitted through the DCI signaling is different from the available state of the reference signal transmitted through the SIB, the available state of the reference signal indicated by a later transmitted one of the DCI signaling and the SIB prevails.

* * * * *